US008087984B2

(12) United States Patent
Okujyo et al.

(10) Patent No.: US 8,087,984 B2

(45) Date of Patent: Jan. 3, 2012

(54) BACCARAT GAME SYSTEM, METHOD OF USING BACCARAT GAME SYSTEM, BACCARAT GAME PROGRAM AND RECORDING MEDIUM

(76) Inventors: Kenichi Okujyo, Kanagawa (JP); Tomoyuki Hashimoto, Kanagawa (JP)

( * ) Notice: Subject to any disclaimer, the term of this patent is extended or adjusted under 35 U.S.C. 154(b) by 395 days.

(21) Appl. No.: 11/232,240

(22) Filed: Sep. 22, 2005

(65) Prior Publication Data

US 2006/0071429 A1 Apr. 6, 2006

Related U.S. Application Data

(63) Continuation of application No. PCT/JP2004/018155, filed on Dec. 6, 2004.

(30) Foreign Application Priority Data

Dec. 9, 2003 (JP) ................................ 2003-410745

(51) Int. Cl.
*A63F 13/00* (2006.01)

(52) U.S. Cl. ........................................................ 463/11

(58) Field of Classification Search ................ 463/9–17; 273/149, 274, 292, 306, 309
See application file for complete search history.

(56) References Cited

U.S. PATENT DOCUMENTS

| | | | | |
|---|---|---|---|---|
| 5,722,893 | A * | 3/1998 | Hill et al. | 463/47 |
| 5,951,396 | A * | 9/1999 | Tawil | 463/19 |
| 6,217,447 | B1 | 4/2001 | Lofink et al. | |
| 6,267,671 | B1 * | 7/2001 | Hogan | 463/25 |
| 6,575,834 | B1 | 6/2003 | Lindo | |
| 6,916,245 | B1 * | 7/2005 | Vancura et al. | 463/26 |
| 2002/0036381 | A1 * | 3/2002 | Scibetta | 273/292 |
| 2002/0147047 | A1 * | 10/2002 | Letovsky et al. | 463/42 |
| 2003/0054870 | A1 | 3/2003 | Sato et al. | |
| 2004/0029087 | A1 * | 2/2004 | White | 434/219 |

FOREIGN PATENT DOCUMENTS

| | | |
|---|---|---|
| JP | 2002017943 | 1/2002 |
| JP | 2003093744 | 4/2003 |
| JP | 2003220169 | 8/2003 |

* cited by examiner

*Primary Examiner* — David L Lewis
*Assistant Examiner* — Eric M Thomas
(74) *Attorney, Agent, or Firm* — Jacobson Holman PLLC

(57) ABSTRACT

It is an object of the present invention is to provide an epoch-making baccarat game system, a method of using such a baccarat game system, a baccarat game program and a recording medium, in which a great number of players can simultaneously participate in the game at the same table, in which any player can concentrate on the game in its personal space, in which, from the viewpoint of game operation side, the number of standing-by dealers can be decreased while at the same time the number of cards to be discarded is reduced, thereby reducing the cost, and in which any doubt of injustice can completely wiped away while maintaining the sense of reality and the feeling of tension. The baccarat game system of the present invention comprises card image capture means 21 for taking images of cards in a baccarat game; card image delivery means 110 for delivering the card images taken by said card image capture means 21; and card image display means 30 for displaying said delivered card images 110.

13 Claims, 9 Drawing Sheets

BACCARAT GAME SYSTEM, METHOD OF USING BACCARAT GAME SYSTEM, BACCARAT GAME PROGRAM AND RECORDING MEDIUM

This is a continuation of PCT/JP2004/018155 filed 6 Dec. 2004 and published in Japanese.

FIELD OF THE INVENTION

The present invention relates a baccarat game system, a method of using baccarat game system, a baccarat game program and a recording medium.

BACKGROUND OF THE INVENTION

A baccarat game is well known as one of casino games.

The flow of a general baccarat game will be described with reference to FIG. 8.

FIG. 8 is a flow chart illustrating the flow of a baccarat game according to the prior art.

First of all, the game starts at S101. A shooter starting process is then performed at S102.

More particularly, a dealer sufficiently shuffles six or eight sets of cards and then sets them in a shooter.

Next, at S103, each user places a bet on a banker winning mark, a player winning mark or a draw mark.

Next, at S104, the dealer takes out a card or cards from the shooter and determines the result of game.

Next, at S105, the dealer settles the bet or bets. Namely, the dealer forfeits the bet or bets or pays an allotment or allotments for the bet or bets.

If the shooter still holds the necessary cards for the game, the program returns to the step S103 at which the game will be re-started. If the shooter holds no card, the program proceeds to S106.

At S106, a shooter terminating process is performed to finish the game.

Such baccarat game has been carried out for the dealer and players on the same table. In such a case, a known technique of supporting the game is used (e.g., see Japanese Laid-Open Patent Application No. 2003-220169).

Such a technique will be described with reference to FIG. 9.

FIG. 9 illustrates a technique according to the prior art.

Reference numeral 1 denotes a baccarat table; 1*a* a design indicative area; 1*b* a peripheral area; 2 a chair on a dealer sits; 3*a*-3*h* chairs on which players sit; 4 a shooter; 5 an input device; 601*a*-601*g* small-sized displays; and 602 a large-sized display.

As the game proceeds, the dealer can input an appearance for a banker and players into the input device 5 to display a series of an appearance data on the small-sized displays 601*a*-601*g* and the large-sized display 602 for giving them to the banker and players.

In addition to such a baccarat game in which the dealer and players play it on the same table, there is also known a so-called net baccarat game in which a computer graphics is used to form a virtual game place on a server and in which the virtual game place is accessed from various personal computers through communication means to play the game.

[Patent Document 1] Japanese Laid-Open Patent Application No. 2003-220169.

SUMMARY OF THE INVENTION

Since, in the aforementioned game according to the prior art, all the dealer and players have to sit on a single table, however, the number of players that can simultaneously participate in the same game will be restricted. If the number of players is too large, the players must be deployed into several tables.

Since a plurality of players must sit around a single table, a personal space will not be provided even if a certain player wants to perform the game in a concentrated or relaxed manner.

From the viewpoint of game operation, furthermore, the dealer must stand by even if there is no player. If a number of tables are provided, the corresponding number of dealers must stand by. This raises a problem in that the cost increases. Although it is desired that the once used cards are discarded for prevention of any foul play, the cost for cards will be increased when there are few players and if the used cards are discarded.

On the other hand, the net game can permit a player to play the game in a larger space such as home or the like in a concentrated or relaxed manner. However, such a player will basically play the game alone against the program while operating the computer. This raises a problem in that the player remarkably lacks the sense of reality and the feeling of tension.

Since the players depend on the program to play the game, the doubt that any bet operation might be done internally could completely be wiped away.

The present invention was made in view of the aforementioned problems. It is therefore an object of the present invention is to provide an epoch-making baccarat game system, a method of using such a baccarat game system, a baccarat game program and a recording medium, in which a great number of players can simultaneously participate in the game at the same table, in which any player can concentrate on the game in its personal space, in which, from the viewpoint of game operation side, the number of standing-by dealers can be decreased while at the same time the number of cards to be discarded is reduced, thereby reducing the cost, and in which any doubt of injustice can completely wiped away while maintaining the sense of reality and the feeling of tension.

The present invention can solve the aforementioned problems by providing the following features.

(1) A baccarat game system comprising card image capture means for taking images of cards in a baccarat game, card image delivery means for delivering the card images taken by the card image capture means and card image display means for displaying the delivered card images.

(2) The baccarat game system described in the item (1), further comprising a dealer's game table and a player's space located spaced apart from the dealer's game table, wherein the card image display means is located in the player's space and wherein said card image delivery means is adapted to deliver the card images to the card image display means in real time.

(3) The baccarat game system as described in the item (2), further comprising bet information input terminal means located in the player's space for inputting player bet information, and a game result input terminal located in the dealer's game table for inputting the result of game.

(4) The baccarat game system described in the item (3), further comprising allotment calculation means for calculating player allotment information from the bet information and the game result.

(5) The baccarat game system described in the item (3) or (4), further comprising baccarat appearance table drawing means for drawing a baccarat appearance table from the result of game.

(6) The baccarat game system described in the item (4) or (5), further comprising personal information recording means for recording the bet information and the allotment information.

(7) The baccarat game system described in any one of the items (1) to (6), further comprising shooter image capture means for taking the image of a shooter, and shooter image display means for displaying the shooter image.

(8) The baccarat game system described in any one of the items (2) to (7), wherein said player's space includes at least one player's table which is only used by a player.

(9) The baccarat game system described in any one of the items (2) to (8), wherein the player's space is a guest room in a hotel.

(10) A method of using a baccarat game system, comprising the steps of taking images of cards in a baccarat game using card image capture means; delivering the card images taken by the card image capture means using cards image delivery means; and displaying the delivered card images through card image display means.

(11) A baccarat game program for causing a computer to function as card image display means for displaying images of cards in a baccarat game in real time and also as bet information input terminal means for inputting player bet information.

(12) A baccarat game business program for causing a computer to function as card image delivery means for delivering images of cards in a baccarat game in real time and also as allotment calculation means for calculating player allotment information from the result of game and bet information.

(13) A computer-readable recording medium in which a baccarat game program described in the item (11) or (12) has recorded.

The present invention can provide an epoch-making baccarat game system, a method of using a baccarat game system, a baccarat game program and a recording medium, in which a great number of players can simultaneously participate in the game at the same table, in which any player can concentrate on the game in its personal space, in which, from the viewpoint of game operation side, the number of standing-by dealers can be decreased while at the same time the number of cards to be discarded is reduced, thereby reducing the cost, and in which any doubt of injustice can completely wiped away while maintaining the sense of reality and the feeling of tension.

The baccarat game system of the present invention can also record histories of bet information and allotment information for each player and provide these histories to the player as a report card, and facilitate any service depending on the player bet information.

In the baccarat game system of the present invention, furthermore, a plurality of players can simultaneously participate in a game performed at the same table. Hence, a contest in which a great number of players can participate can easily be run, thereby providing common topics during and after the game.

In the baccarat game system of the present invention, moreover, the baccarat game system can less produce error by restricting the player's operation of terminals depending on the state of the system so that any inexperienced player will not interfere the whole progress of the game.

Additionally, in the baccarat game system of the present invention, even inexperienced players and beginners can freely participate in the game.

EXPLANATION OF REFERENCE NUMERALS

| | |
|---|---|
| 1 | Baccarat Table |
| 1a | Design Indicative Area |
| 1b | Peripheral Area |
| 2 | Dealer's Chair |
| 3a-3h | Players' Chairs |
| 4 | Shooter |
| 5 | Input Device |
| 12 | Players |
| 21 | Card Image Capture Camera |
| 22 | Shooter Image Capture Camera |
| 30 | Terminals |
| 31 | Main Screen Section |
| 32 | Sub-Screen Section |
| 33 | Bet Screen Section |
| 34 | Switch Button |
| 40 and 50 | Large-Sized Screen |
| 60 | Dealer's Game Table |
| 61 | Shooter |
| 70 | Players' Tables |
| 80 | Chairs |
| 110 | Image Server |
| 120 | Database Server |
| 130 | Dealer's Terminal |
| 140 | Administrative Terminal |
| 150 | Hub |
| 601a-601g | Small-Sized Displays |
| 602 | Large-sized Display |
| C | Cards |
| L | Baccarat Rule Table |
| N | Network |
| V | Video Signal |

DETAILED DESCRIPTION OF THE INVENTION

The first embodiment of the present invention will now be described in detail.

Referring now to FIGS. 1-4, the arrangement of a baccarat game system according to this embodiment will first be explained.

Figure 1:
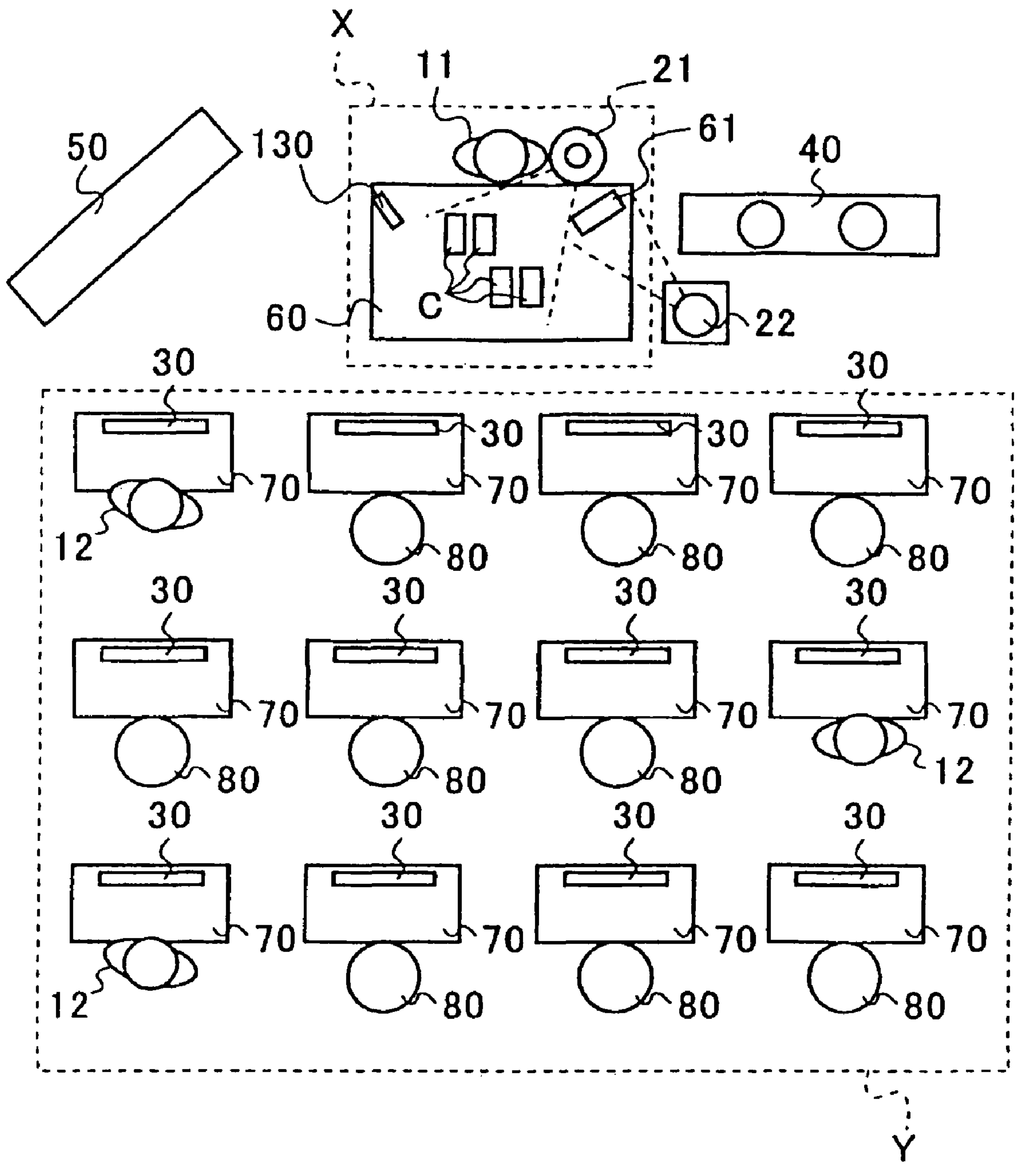
FIG. 1 is a plan view of a game area in a baccarat game system according to the first embodiment of the present invention.
Figure 2:
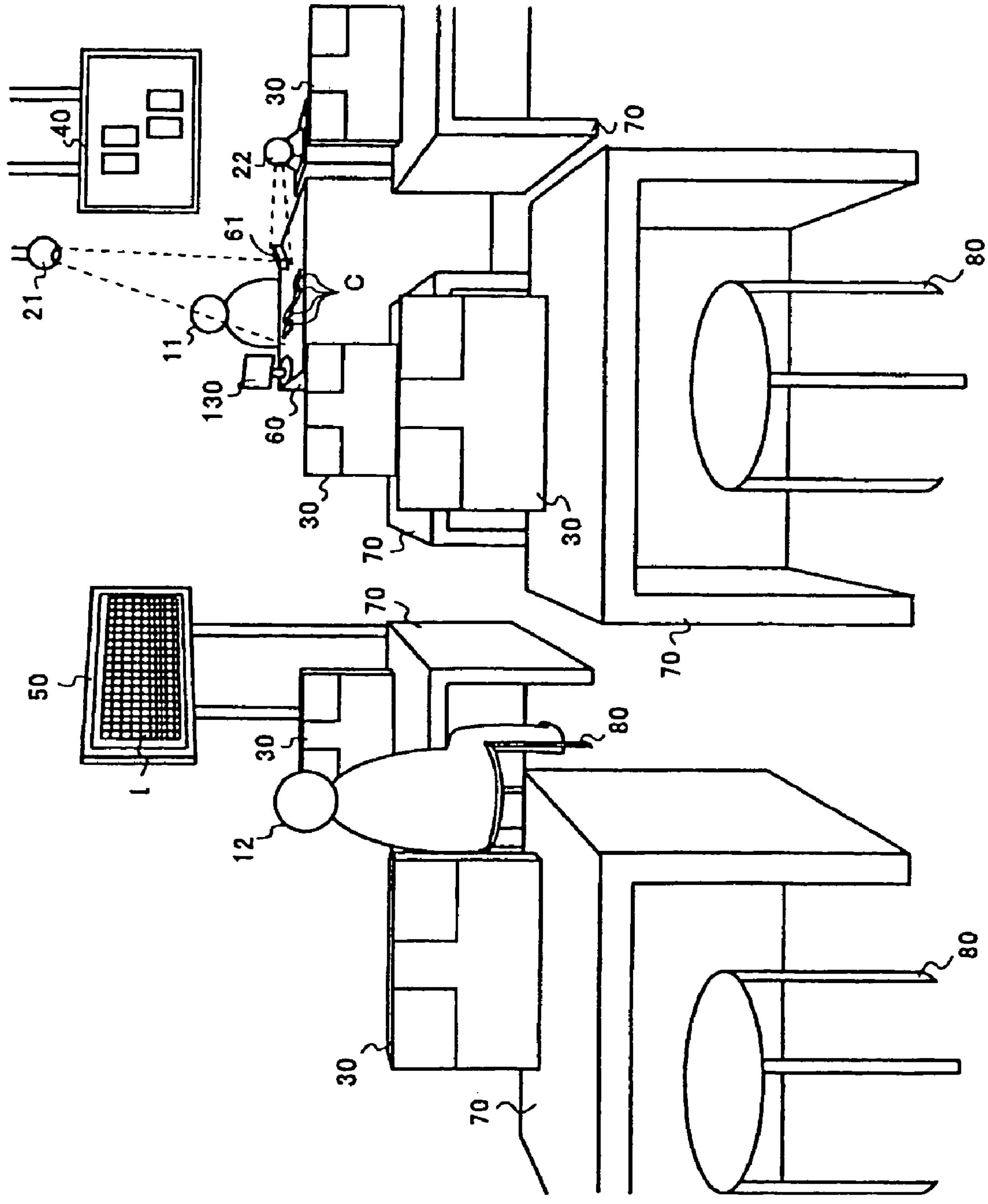
FIG. 2 is a perspective view of the game area in the baccarat game system of the first embodiment.
Figure 3:
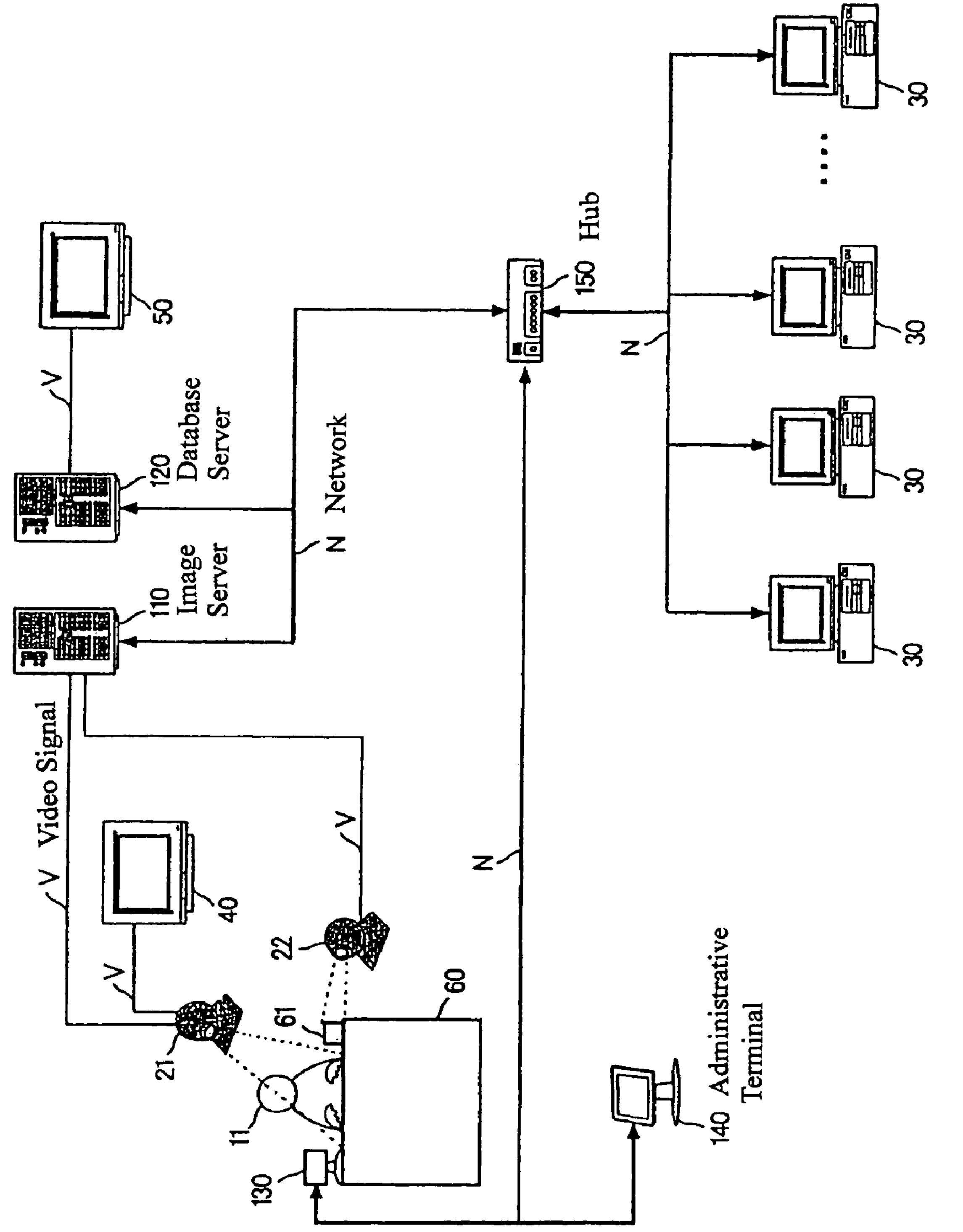
FIG. 3 is a system block diagram of the baccarat game system according to the first embodiment.
Figure 4:
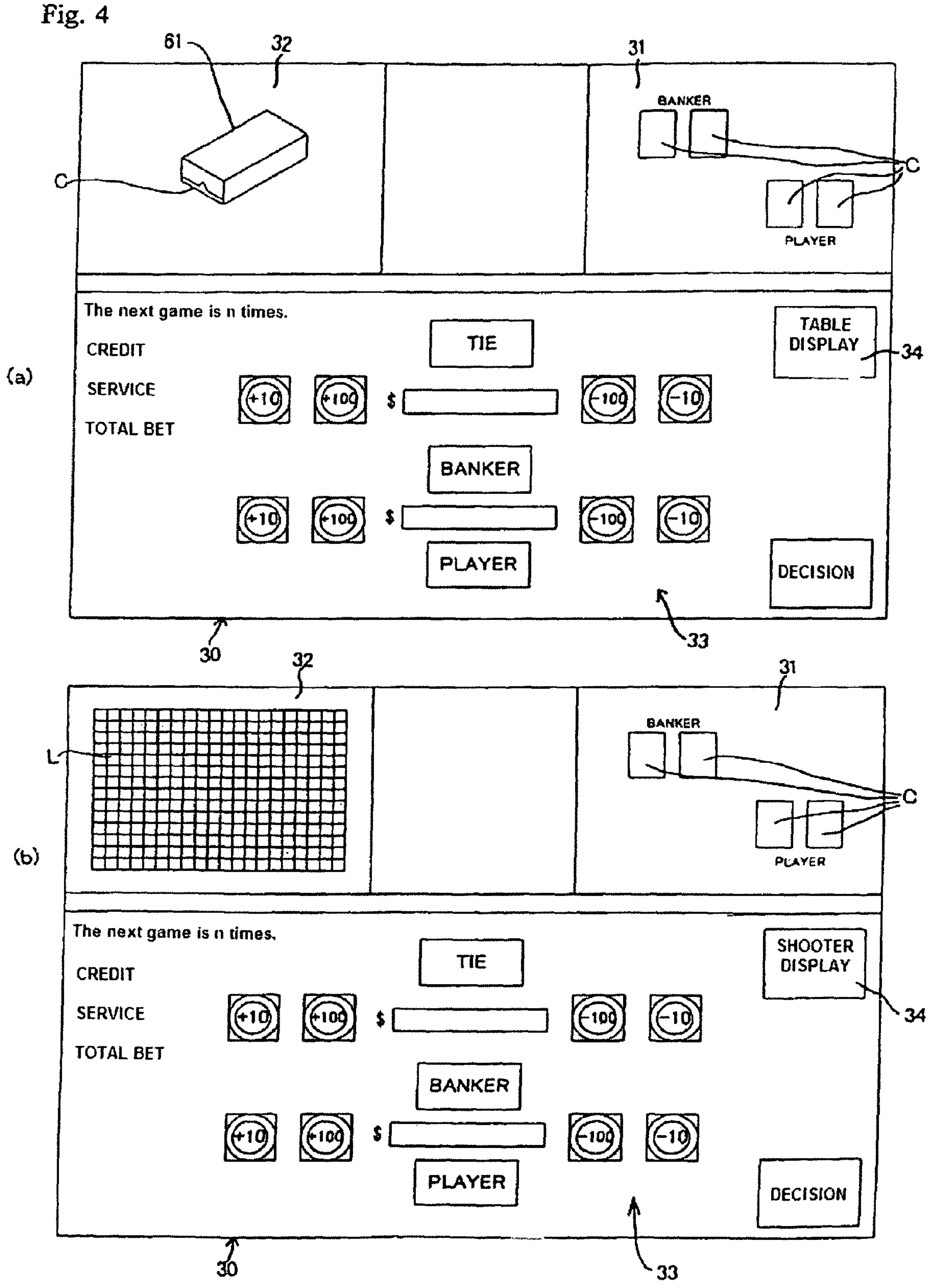
FIG. 4 exemplifies scenes in a terminal, FIG. 4(*a*) shows a shooter in a sub-scene and FIG. 4(*b*) shows a baccarat appearance table in the sub-scene.

FIG. 1 is a plan view of a game place including a baccarat game system according to the first embodiment of the present invention; FIG. 2 is a perspective view of the game place shown in FIG. 1; FIG. 3 is a block diagram of a baccarat game system according to the first embodiment of the present invention; FIG. 4 exemplifies screen sections in a terminal, with FIG. 4(*a*) shows a shooter in a sub-screen section and FIG. 4(*b*) shows a baccarat appearance table in the sub-screen section.

Reference numeral 11 denotes a dealer; 12 denotes players; 21 denotes a card image capture camera which functions as card image capture means for capturing images of cards in a baccarat game, that is, images of cards that are actually used during the baccarat game; 22 denotes a shooter image capture camera which functions as shooter image capture means for capturing the image of a shooter.

Reference numeral 30 denotes terminals each of which functions as card image display means for displaying delivered card images, as a personal display terminal, as bet information input terminal for inputting player bet information, as allotment display means for displaying allotment information, as history display means for displaying the history of game result and as shooter image display means for displaying the image of the shooter taken by the shooter image capture camera 22. Each of the terminals 30 may take any form of personal computer, touch panel-type display, interactive TV and the like. Each of the terminals 30 may also be of the form of a portable terminal such as mobile telephone, PDA or the like. The terminals 30 are located within a player's space Y.

Reference numeral 31 designates a main screen section on which card images are displayed; 32 a sub-screen section on which a shooter 61 is displayed or on which a baccarat appearance table L is displayed; 33 a bet screen section into which the bet information of a player 12 can be inputted; and 34 a switch button for changing the sub-screen section 32 from the shooter 61 to the baccarat appearance table L or vice versa in display.

Reference numerals 40 and 50 denote large-sized screens such as plasma displays, liquid crystal displays or the like. The large-sized screens 40 and 50 may be replaced by projection screens. The large-sized screen 50 functions as history display means for displaying a baccarat appearance table L which represent a history of game result.

Reference numeral 60 is a dealer's game table for performing a baccarat game. In this embodiment, the dealer's game table 60 can only be used by the dealer 11, but may be used by few players 12 in addition to the dealer 11.

Reference numeral 61 denotes a shooter; and 70 player's tables each of which can only be used by one player. These player's tables 70 are located within the player's space Y. Reference numerals 80 designate chairs; and 110 an image server which functions as card image delivery means for delivering the card images taken by the card image capture camera 21 and as shooter image delivery means for delivering the image of the shooter taken by the shooter image capture camera 22. In principle, the image server 110 is adapted to deliver the images of cards and shooter to the terminal 30 in real time.

Reference numeral 120 designates a database server functioning as bet information recording means for recording the bet information, as game result recording means for recording the result of the game, as allotment calculation means for calculating allotment information for the players 12 from the bet information and game result, as baccarat appearance table drawing means for drawing the baccarat appearance table from the result of the game, and personal information recording means for recording the bet information and allotment information. Reference numeral 130 denotes a game result input terminal for inputting the result of the game and only used by the dealer. The game result input terminal is located on the dealer's game table 60.

Reference numeral 140 designates an administrative terminal; and 150 a hub. The hub 150 may be replaced by any router.

Symbol C shows cards; and symbol L denotes a baccarat appearance table which represents the history of game result and also the most recent series of the appearance data. Symbol N represents a network such as ETHERNET® or the like; V video signal; X a dealer space; and Y a player's space located spaced apart from the dealer's game table 60. In principle, the player's space Y can only be used by players 12.

In this embodiment, as shown in FIGS. 1 and 2, the dealer's game table 60 is arranged in advance as a platform in a school while the player's terminals 30 are arranged opposite to the dealer's game table 60 as desks in the school. The baccarat game tables are divided into the dealer's game table 60 and the player's tables 70 unlike the conventional baccarat game tables.

Only the dealer 11 stands or sits behind the dealer's game table 60 and opposite to the player's terminals 30 and advances the game. This baccarat game is a baccarat game actually performed on the game table 60.

The dealer's game table 60 only has the necessary matters for the dealer, such as the shooter 61, the dealer's terminal 130, a place on which banker cards must be set, a place on which player cards must be set and the like, but not include a conventional baccarat table place at which the players 12 bet. Thus, the dealer's game table 60 may be smaller.

In principle, each of the players 12 sits on a chair 80 behind a player's table 70 and opposite to the small-sized dealer's game table 60. Thus, each of the players can see the screen of his or her player's terminal 30 and also the large-sized screens 40, 50 as well as the dealer 11. Since each of the player's tables 70 is in the form of a personal table, one personal space can be provided to each of the players 12.

In such a manner, the baccarat game tables are divided into the dealer's game table and the player's tables. All the dealer and players will not sit behind a single table. As a result, a widened personal space can be provided to each of the players. Therefore, each of the players 12 can participate in the game without changing attention to the other players and in a concentrated or relaxed manner.

As shown in FIG. 3, by taking the cards C by card image capture camera 21 during the actually performed baccarat game and transmitting the taken images of the cards to the large-sized screen 40 through the video signal V as video signals, the picture of the baccarat game can be displayed in real time. At the same time, by transmitting the card images from the card image capture camera 21 to the image server 110 through the video signal V as video signals and further delivering the taken card images to each of the terminals 30, the dealer's terminal 130 and the administrative terminal 140 through the network N and hub 150, the state of the baccarat game being actually performed can be displayed in real time. In other words, the picture of the game being performed on the dealer's game table 60 can be captured and delivered to the terminals 30 on the player's tables 70 for displaying them in real time. Although it is desired that the card images are video images, they may be consecutive still images.

Hereby, one dealer can perform the baccarat game against a number of players 12 using cards allocated to a single table.

Even if the number of player's terminals 30 is increased, any number of players 12 can theoretically participate in the same game at the same time.

Since the players 12 can participate in a game performed on the same dealer's game table 60, a contest in which a number of players can easily participate can be run with common topics being provided during and after the game.

From the viewpoint of game operation side, the number of standing-by dealers 11 can be reduced if there is no player 12. In addition, the number of cards to be discarded after the game can be reduced, resulting in reduction of cost.

Since the dealer 11 advances the game using the real cards C unlike the network game, the sense of reality and the feeling of tension can be maintained in compared with the network games which use the computer graphics. Doubt of injustice can be wiped away since the real cards C are used in the baccarat game system.

Since the shooter image capture camera 22 takes the state of the shooter containing unused cards with the image of such a shooter being then transmitted to the image server 110 through the video signal V as video signals which are in turn delivered to the respective player's terminals 30, dealer's terminal 130 and administrative terminal 140 through the network N and hub 150 in real time, the players 12 can always monitor the shooter 61 and confirm whether or not any injustice is being done. Hereby, the doubt of injustice from the players 12 which would raise one problem in the conventional network games can be wiped away. Therefore, the players 12 can comfortably play the game.

Although it is desired that the card image capture camera 21 for taking the card C on the hand of the dealer 11 is provided separately from the shooter image capture camera 22 for taking the shooter 61, a single wide-angle camera may be used in place of these cameras 21 and 22.

Each of the player's terminals 30 can be used to input the bet information for the corresponding player and to transmit it to the database server 120 through the network N and hub 150. The database server 120 can then record the transmitted bet information.

As shown in FIG. 4, the input of bet information can be carried out by determining the type and number of chips in the bet screen section 33 while expecting either of the banker's winning, player's winning or draw.

Each of the player's terminals 30 can receive and display the result of game from the dealer's terminal 130 through the database server 120. Each of the player's terminals 30 can also receive the allotment information calculated by the database server 120 and display the allotment for the corresponding player itself in the game.

The database server 120 can automatically accumulate the histories of bet and allotment information for each player 12 as in each of the player's terminals 30.

The accumulated information can be used to provide the result of game to each of the players 12 and to provide any service depending on the bet information of that player 12.

The dealer's terminal 130 is one that can only be used by the dealer and that can input the results of game and the appearance. The dealer's terminal 130 can also perform various necessary operations for the game such as stoppage of bet and others.

The administrative terminal 140 is one that can be used by a game administrator (not shown) and that can perform administrative operations such as interrupt of the game in any system trouble and correction of the inputted results of game from the dealer 11.

Furthermore, the large-sized screen 40 can be use to display the images of cards as in the player's terminals 30, thereby further improving the sense of reality. In addition, the large-sized screen 50 can be used to display the baccarat appearance table L made by the database server 120 according to the input of game result from the dealer 11 at any time. This can provide the flow of the appearance, the successive winning situation and others to the players 12 as well as the gallery, thereby further enlivening the whole game.

The method of displaying the baccarat appearance table L is such that, for example, if the appearance for the banker and players are 7 and 3, a collective figure "73" is displayed in a single square and such that the banker and player winnings are separately represented by different colored letters, for example, red- and black-colored letters for better understanding. With a draw, the appearance at that time may be represented with an adjacent triangle, for example, "5Δ" for better understanding.

The actual display starts at the first, uppermost and leftwardmost square in the baccarat appearance table L. If the banker or a player wins the consecutive games with draw games therebetween, the scores will be displayed sequentially in the respective downwardly arranged squares on the same column. If the consecutive winnings are interrupted, the score at that time will be displayed in the uppermost square on the adjacent and rightward column. Thus, the banker's and player's winnings will alternately be displayed. Therefore, everybody can easily understand the state of consecutive winnings.

The operation of a baccarat game system according to this embodiment of the present invention will now be described with reference to FIGS. 5 and 6.

Figure 5:
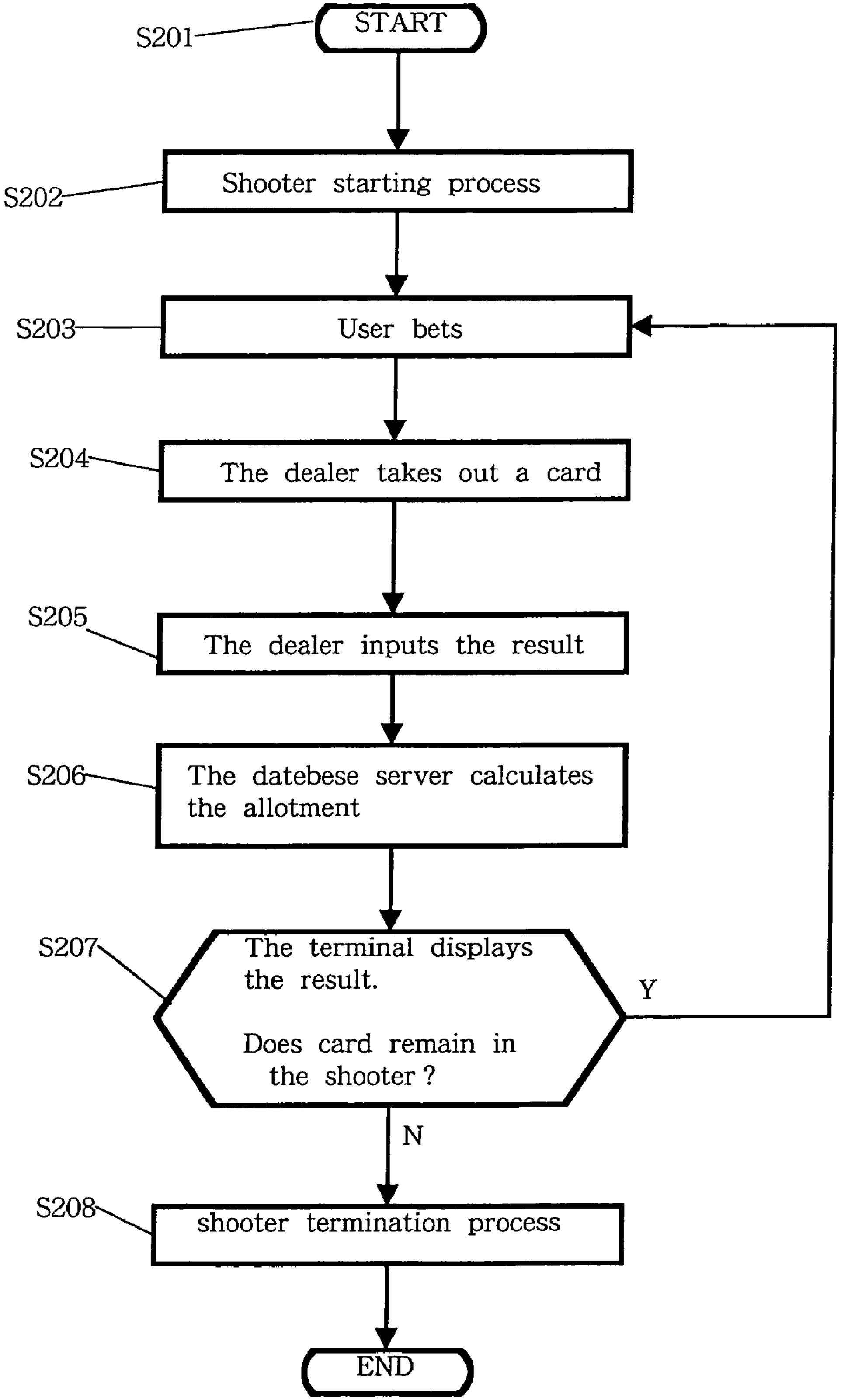
FIG. 5 is a flow chart schematically showing the operation of the baccarat game system according to the first embodiment.
Figure 6:
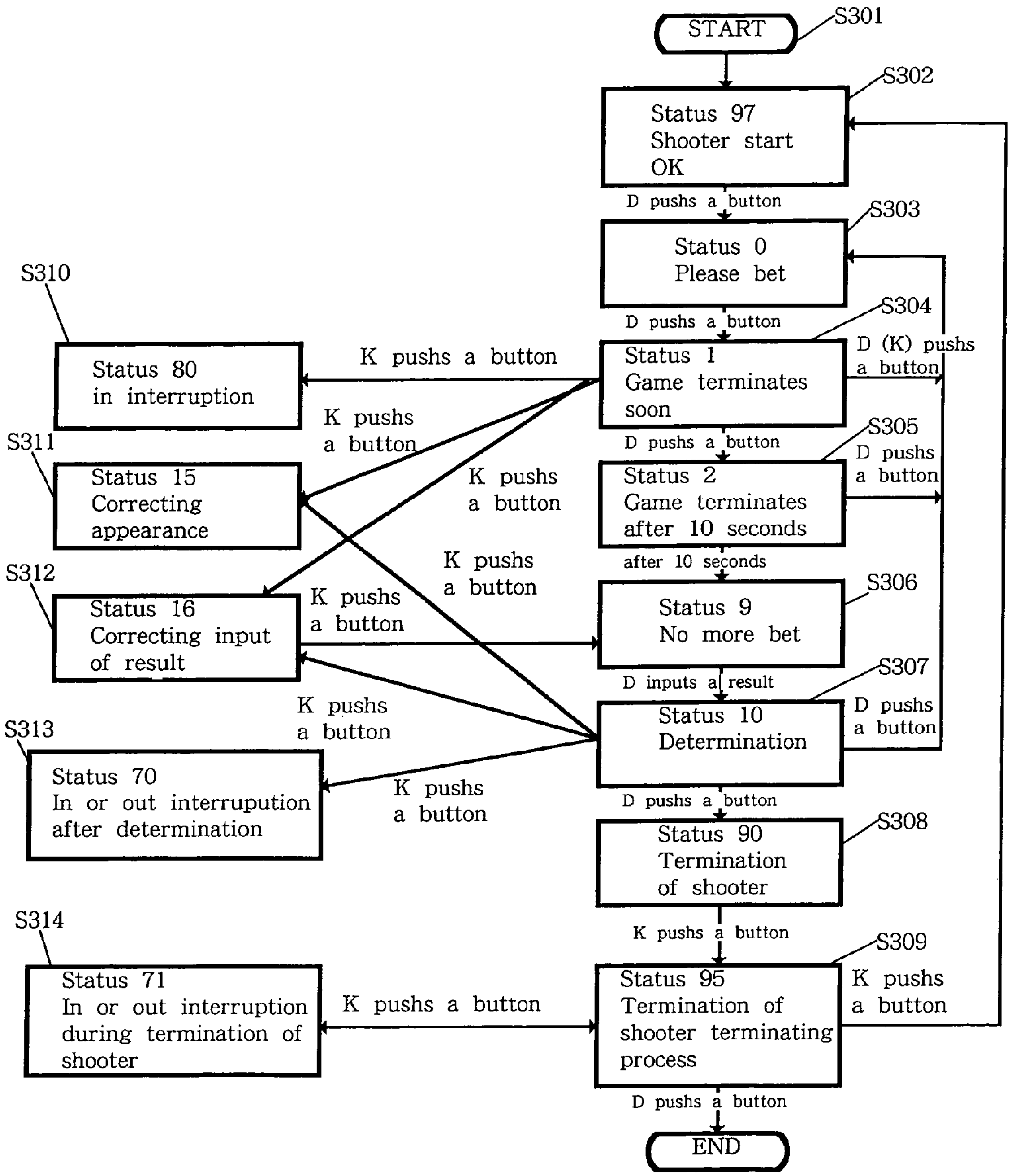
FIG. 6 is a flow chart showing the transition of state in the baccarat game system according to the first embodiment.

FIG. 5 shows a flow chart that schematically illustrates the operation of the baccarat game system according to the first embodiment while FIG. 6 is a flow chart that illustrates the transition of state in the operation of the baccarat game system according to the first embodiment.

Referring first FIG. 5, the schematic operation of the baccarat game system of the present invention will be described.

The game starts at S201. The shooter starting process is then initiated at S202.

More particularly, the dealer 11 well shuffles six or eight sets of cards and sets them in the shooter 61.

Next, at S203, each of the players 12 who are users bets with a banker's winning, player's winnings or draw through his or her terminal 30.

When each of the players 12 inputs his or her bet information in the bet screen section 33 through his or her terminal 30, that bet information can electronically be transmitted to and recorded in the database server 120 through the network N and hub 150. The inputs from each terminal 30 are individually processed by the database server 120.

At this time, each of the terminals 30 functions as a bet information input terminal into which the bet information of one player 12 can be inputted, according to a baccarat game program. Such a baccarat game program can also cause the database server 120 to function as bet information recording means in which the bet information of all the players 12 can be recorded.

Next, at S204, the dealer 11 takes out a card or cards C from the shooter 61 and determines the result of game. At this time, the cards being used during the baccarat game are taken by the card image capture camera 21. The card images captured by the card image capture means camera 21 are then delivered to the image server 110 which in turn delivers them to the respective terminals 30. Thus, each of the terminals 30 can display the delivered card images.

At this time, the database server 120 functions as card image delivery means for delivering the captured images of the cards C being used during the baccarat game in real time, according to the baccarat game program. Each of the terminals 30 functions as card image display means for displaying the captured images of the cards C being used during the baccarat game in real time, according to the baccarat game program.

Next, at S205, the dealer 11 inputs the result of game through the dealer's terminal 130. More particularly, the dealer 11 inputs the appearance of the banker and players and also inputs the result of game relating to whether the game is won or drawn by the banker or player.

Such inputs are then transmitted to the database server 120 through the network N and hub 15.

On input, the input relating to the winning or defeat may be omitted when it is previously determined that the appearance should be inputted in order of the banker followed by the players and if the database server 120 uses a program for automatically judging the winning or defeat or the draw in the game, Next, at S206, the database server 120 calculates the allotment for each terminal 30 from the bet information recorded in the terminal 30 as well as the result of game. At this time, the database server 120 functions as allotment calculation means for calculating the allotment information of the players 12 from the bet information and the result of game, according to the baccarat game program.

The calculated allotment information is then transmitted to the respective terminals 30 through the network N and hub 150. If the bet of a player 12 is out, the result thereof is transmitted to his or her terminal 30.

Next, at S207, each of the terminals 30 displays the result of game, based on the reception of signals from the database server 120. The terminal 30 of a player 12 whom bet is right displays his or her winning as well as the allotment thereof transmitted from the database server 120. If the bet of another player 12 is lost, his or her terminal 30 displays the defeat thereof.

If the cards C remain in the shooter 61, the procedure returns to S203 wherein the game will be re-started.

If no card C remains in the shooter 61, the procedure proceeds to S208.

At S208, the shooter termination process is performed to finish the game.

Referring now to FIG. 6, a transition of state in the operation of the baccarat game system according to the present invention will be described.

In FIG. 6, each square shows the number of state at its upper part and the explanation of state at its lower part. Thick lines show bidirectional transitions while thin lines show unidirectional transitions. Sentences adjacent to the respective lines represent transitional actions.

K represents the administrative terminal 140 while D shows the dealer's terminal 130.

The baccarat game system of this embodiment is controlled based on system status number. The status number is mainly changed depending on the actions in the administrative terminal 140 and dealer's terminal 130. Depending on such a change, the subsequent operations to be performed by all the terminals 30 connected to the database server 120, dealer's terminal 130 and administrative terminal 140 are determined.

First of all, the game starts at S301. At S302, the status number is changed to 97 wherein "SHOOTER START, OK" is displayed in the terminals 30, dealer's terminal 130 and administrative terminal 140. In such a situation, only the dealer's terminal 103 can be operated. In the dealer's terminal 130, the dealer 11 shuffles the cards C and sets them in the shooter 61. Thereafter, the dealer 11 pushes a predetermined button, thereby changing the state wherein the game can be advanced to S303.

At S303, the status number is changed to zero (O) wherein "PLEASE BET" is displayed in the terminals 30, dealer's terminal 130 and administrative terminal 140. In such a state, all of the player's terminals 30, dealer's terminal 130 and administrative terminal 140 can be operated. Bet information can be inputted through each of the terminals 30. In the dealer's terminal 130, the dealer 11 pushes a predetermined button while observing the state of bet from the players 12, thereby changing the state wherein the game can be advanced to S304.

If any system trouble occurs, a predetermined button in the administrative terminal 140 is pushed to change the state wherein the game can be advanced to an interruption mode (status number 80) at S310. If the administrator finds any mistake in the past data, for example, he or she pushes another predetermined button to advance the game to an appearance table correction mode (status number 15) at S311 or a result input correction mode (status number 16) at S312.

At S304, the status number is changed to one (1) wherein "GAME TERMINATES SOON" is displayed in the terminals 30, dealer's terminal 130 and administrative terminal 140. In this situation, all of the terminals 30, dealer's terminal 13 and administrative terminal 140 can be operated. Bet information can be inputted through each of the terminals 30. In the dealer's terminal 130, the dealer 11 pushes a predetermined button while observing the state of bet from the players 12, thereby changing the state wherein the game can be advanced to S305.

If there has been no player 12 due to the withdrawing of bet or any other event, a predetermined button can be pushed to change the state wherein the game can be advanced to S303. The administrative terminal 40 can also be actuated to change the state wherein the game can be advanced to S303.

At S305, the status number is changed to 2 wherein "GAME TERMINATES AFTER 10 SECONDS" is displayed in the terminals 30, dealer's terminal 13 and administrative terminal 140. In such a state, only the terminals 30 and dealer's terminal 130 can be operated. Bet information can be inputted through each of the terminals 30. In the dealer's terminal 130, the dealer 11 pushes a predetermined button while observing the state of bet from the players 12, thereby changing the state wherein the game can be advanced to S306 after 10 seconds. If there has been no player 12 due to the withdrawing of bet or any other event, a predetermined button can be pushed to change the state wherein the game can be advanced to S303.

At S306, the status number is changed to 9 wherein "NO MORE BET" is displayed in the terminals 30, dealer's terminal 13 and administrative terminal 140. In such a state, only the dealer's terminal 130 can be operated. In the dealer's terminal 130, the dealer 11 takes out, distributes and opens the cards C from the shooter 61. According to a pre-defined rule, the dealer 11 performs a stand or draw to determine the winning or defeat or draw between the banker and the players. The dealer 11 then inputs the appearance or the winning or defeat into the dealer's terminal and pushes a predetermined button, thereby changing the state wherein the game can be advanced to S307.

At S307, the status number is changed to 10 wherein the terminals 30 display the winning or defeat and the allotment for the respective players and the dealer's terminal 130 and administrative terminal 140 display "DETERMINATION". In such a state, only the dealer's terminal 130 and administrative terminal 140 can be operated. At the dealer's terminal 130, the dealer 11 observes the shooter 61. If the necessary cards C remain in the shooter 61, the dealer 11 pushes a predetermined button, thereby changing the state to advance the game to S303. If the shooter 61 does not have the necessary cards C for the game, the dealer 11 pushes a predetermined button, thereby changing the state to advance the game to S308. At the administrative terminal 140, the administrator may push a predetermined button if he or she finds any mistake in data, thereby changing the state wherein the game can be advanced to the appearance table mistake correction mode (status number 15) at S311 or the input correction mode (status number 16) at S312. If any trouble occurs, the administrator may push another predetermined button, thereby advancing the game to either of IN or OUT interruption modes (status number 70) after the determination at S313.

At S308, the status number is changed to 90 wherein "TERMINATION OF SHOOTER" is displayed in the terminals 30, dealer's terminal 13 and administrative terminal 140. In such a state, only the administrative terminal 140 can be operated. At the administrative terminal 140, the administrator may push a predetermined button to transit the state wherein the game can be advanced to S309.

At S309, the status number is changed to 95 wherein "TERMINATION OF SHOOTER TERMINATING PROCESS" is displayed in the terminals 30, dealer's terminal 13 and administrative terminal 140. In such a state, only the administrative terminal 140 can be operated. If any trouble occurs, the administrator may push a predetermined button in the administrative terminal 140 to change the state wherein the game can be advanced to either of IN or OUT on-termination-of-shooter interruption mode (status number 71) at S314. If it is desired to re-start the game with a new shooter 16, the administrator may push a predetermined button to advance the game to S302. If it is wanted to finish the game, the administrator may push another predetermined button to advance the game to Finish of System.

At S310, the status number is changed to 80 wherein "IN interruption" is displayed in the terminals 30, dealer's terminal 130 and administrative terminal 140. In such a state, only the administrative terminal 140 can be operated. At the administrative terminal 140, the administrator may push a predetermined button after confirmed that the trouble or the like has been overcome, thereby changing the state wherein the game can be advanced to S303.

At S311, the status number is changed to 15 wherein "CORRECTING APPEARANCE" is displayed in the terminals 30, dealer's terminal 13 and administrative terminal 140. In such a state, only the administrative terminal 140 can be operated. At the administrative terminal 140, the administrator may push a predetermined button after confirmed that the appearance table have been corrected, thereby changing the state wherein the game can be advance to S303 or S307.

At S312, the status number is changed to 16 wherein "CORRECTING INPUT OF RESULT" is displayed in the terminals 30, dealer's terminal 130 and administrative terminal 140. In such a state, only the administrative terminal 140 can be operated. At the administrative terminal 140, the administrator may push a predetermined button after confirmed that the input of result has been corrected, thereby changing the state wherein the game can be advanced to S306.

At S313, the status number is changed to 70 wherein "IN OR OUT INTERRUPTION AFTER DETERMINATION" is displayed in the terminals 30, dealer's terminal 13 and administrative terminal 140. In such a state, only the administrative terminal 140 can be operated. At the administrative terminal 140, the administrator may push a predetermined button after confirmed that the trouble or the like has been overcome, thereby changing the state wherein the game can be advanced to S307.

At S314, the status number is changed to 71 wherein "IN OR OUT INTERRUPTION DURING TERMINATION OF SHOOTER" is displayed in the terminals 30, dealer's terminal 13 and administrative terminal 140. In such a state, only the administrative terminal 140 can be operated. At the administrative terminal 140, the administrator may push a predetermined button after confirmed that the trouble or the like has been overcome, thereby changing the state wherein the game can be advanced to S309.

By limiting the operation depending on the state in this way, the system may produce less error, thereby smoothly advancing the entire game. Thus, even any inexperienced player will not interfere with the whole progress of the game. Also, any beginner may not worry about if they will interfere with the whole progress of the game. As a result, all the beginners can participate in the game with easy assurance.

It is desirable that all the above-mentioned operations are realized by a computer according to any suitable program.

Such a program may be recorded in any suitable computer-readable recording medium.

The configuration of the second embodiment is substantially similar to that of the first embodiment except that each of the terminals 30 is located in a guest room R of a hotel. Therefore, the similar parts have the similar reference numerals, but will not be further described herein.

Figure 7:
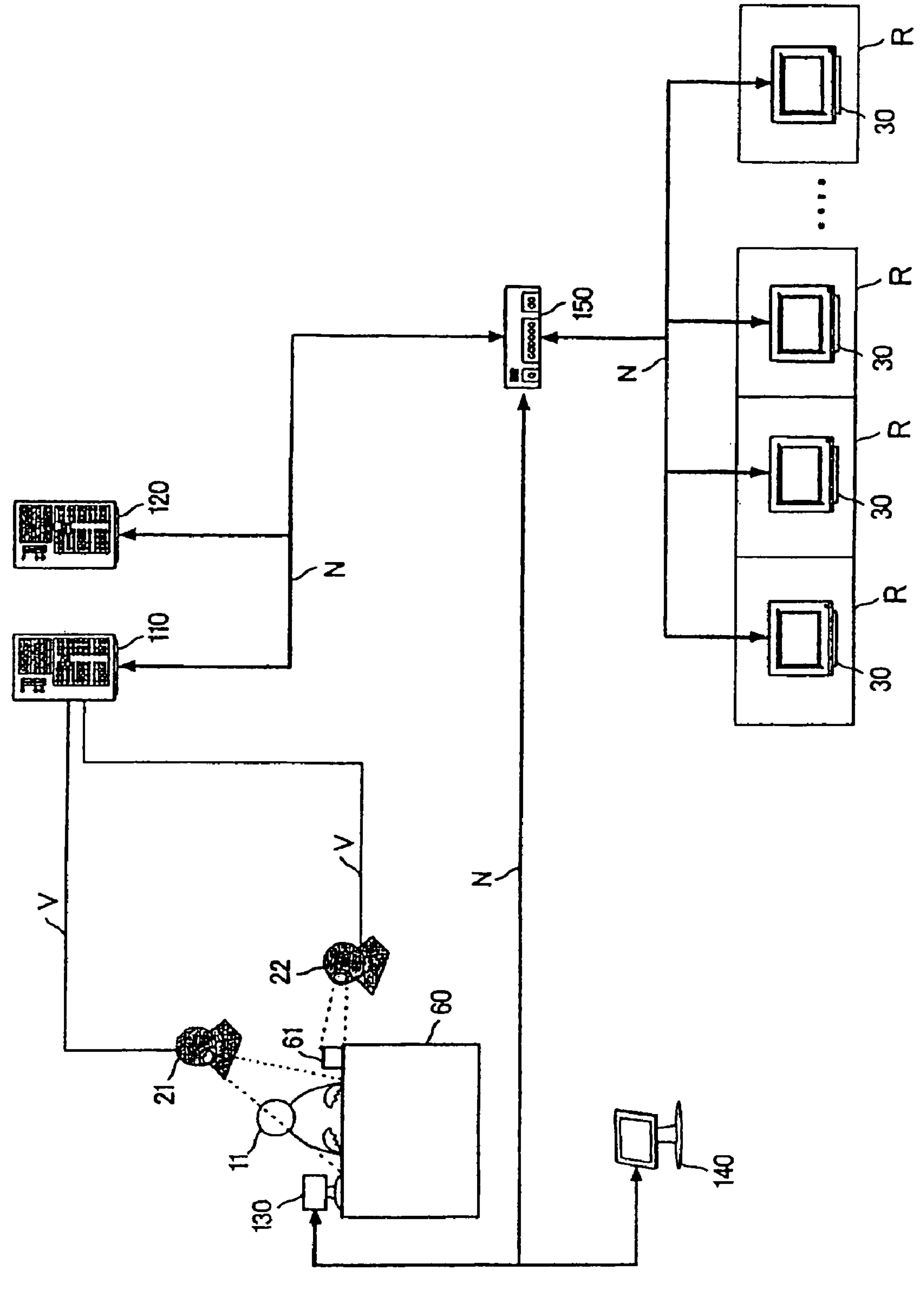
FIG. 7 is a system block-diagram of a baccarat game system according to the second embodiment.
Figure 8:
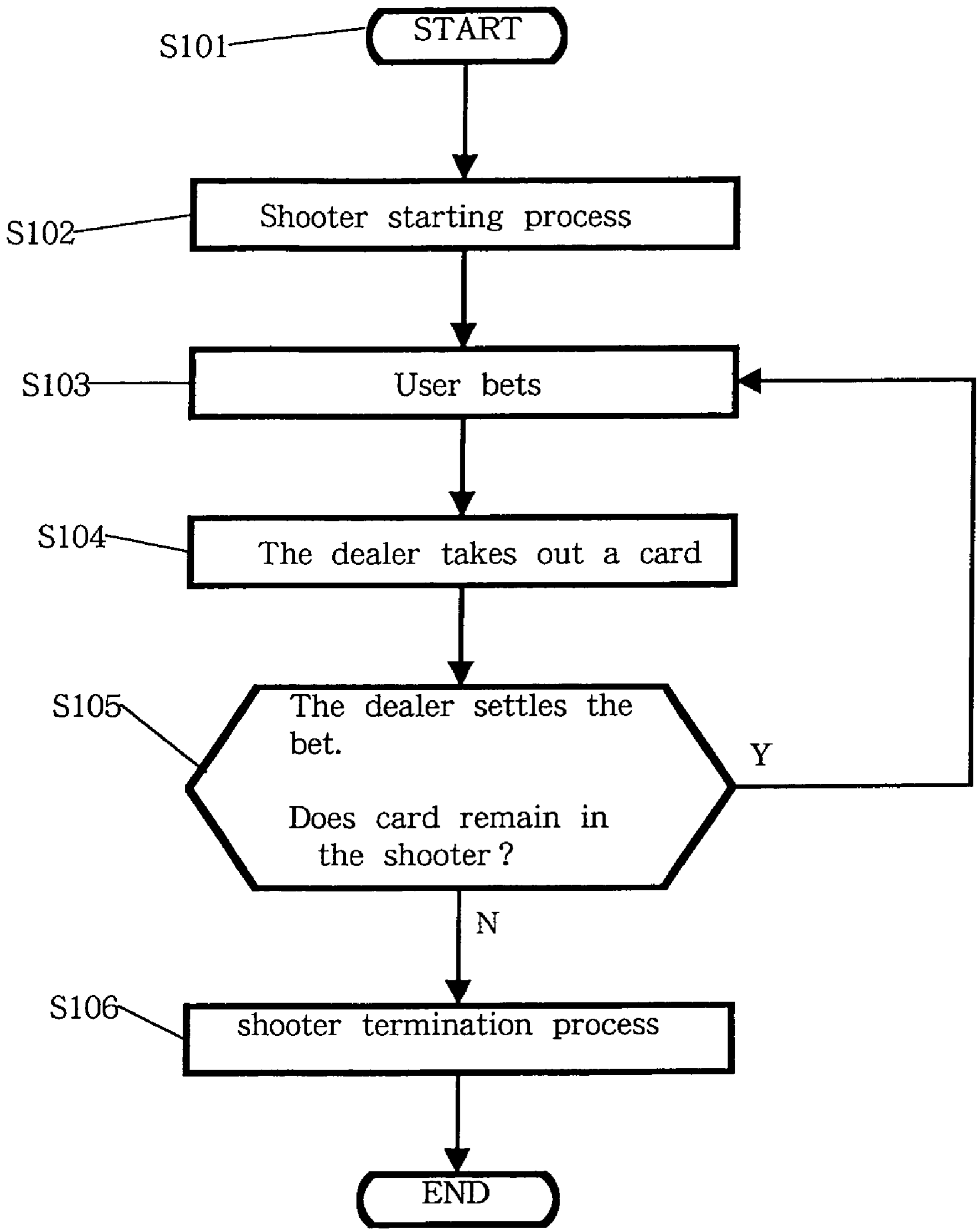
FIG. 8 is a flow chart showing the flow of a game according to the prior art.
Figure 9:
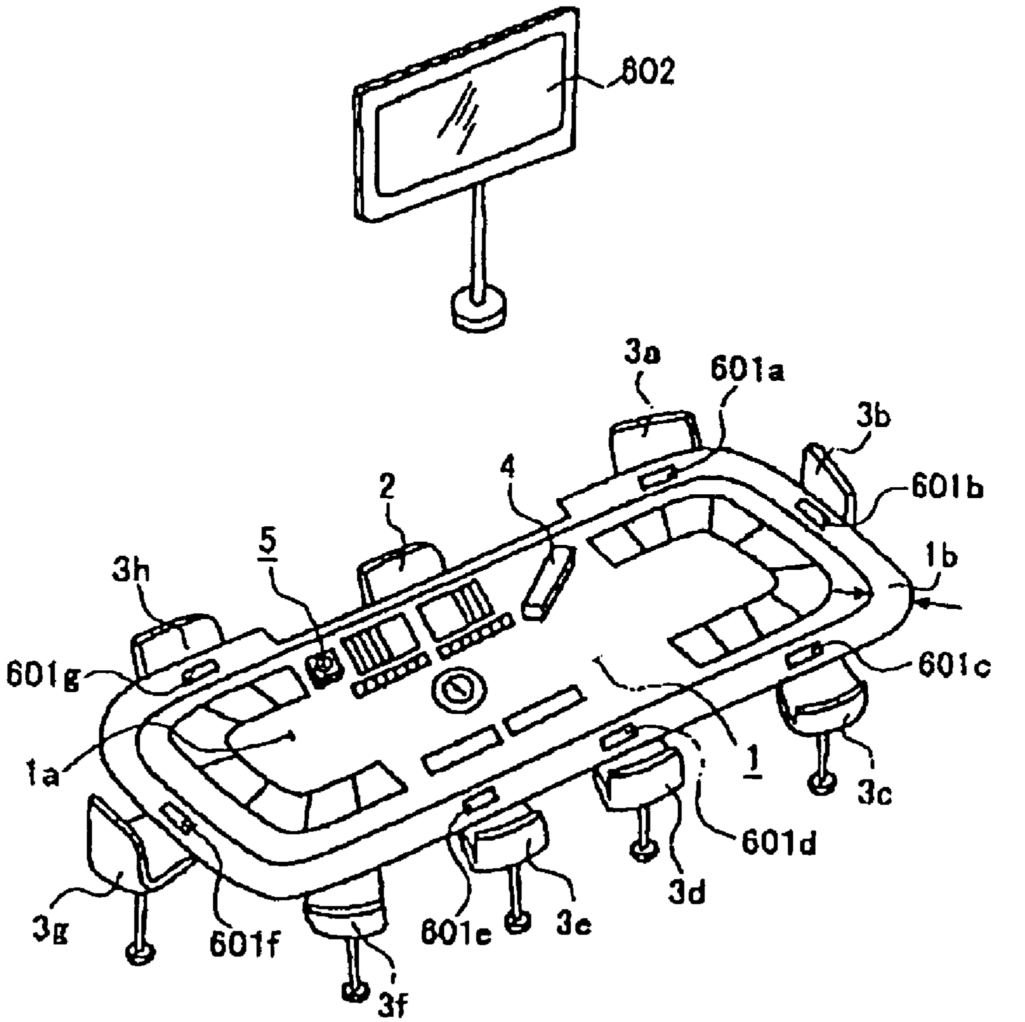
FIG. 9 is a perspective view showing a game area according to the prior art.

Referring now to FIG. 7, the second embodiment of the present invention will be described.

FIG. 7 is a system block-diagram of a baccarat game system according to the second embodiment.

Symbol R denotes guest rooms of a hotel or hotels, each of which provides one player's space Y.

In the second embodiment, each of the terminals 30 is located within one guest room of a hotel. Therefore, the players 12 can calmly play a game in a concentrated or relaxed manner.

The second embodiment can also provide a user-friendly game system in which any player can freely participate in a game.

According to the present invention, the network N can be used to gather players widely from all over the world through internet. Since there is a big difference in ability for receiving moving images between personal computers under the present conditions, however, it is believed that it is desirable to perform the game in a restricted area, for example, within the same building.

The invention claimed is:

1. A baccarat game system employing cards, the baccarat game system comprising:
- a dealer's game table;
- a shooter;
- card image capture means for capturing images of cards in a baccarat game actually performed on the dealer's game table;
- shooter image capture means for capturing the image of the state of a shooter containing unused cards;
- an image server having a card image delivery means for delivering the card images captured by the card image capture means in real time and a shooter image delivery means for delivering a shooter image captured by the shooter image capture means in real time;
- a database server;
- a dealer's terminal for use by a dealer, wherein the dealer's terminal has means for inputting game result information about the result of a game and the appearance of a card, and means for sending commands to change the state of the system to advance the game to allow betting by players when cards are set in the shooter, to change the state of the system to notify players of imminent termination of the game, to change the state of the system to advance the game to allow betting by players if there have been no players, to change the state of the system to notify players that no further bets can be placed, to change the state of the system to display on the player's terminal whether the player has won or lost and the allotment for the respective players, and to change the state of the system to terminate the shooter if the dealer observes that the shooter does not have the necessary cards for the game;

an administrative terminal for use by a game administrator, wherein the administrative terminal has means for sending commands to change the state of the system to advance the game to an interruption mode if any system trouble occurs, to change the state of the system to advance the game to an appearance table correction mode or a result input correction mode if the administrator finds any mistake in past data, to change the state of the system to advance the game to allow betting by players if there have been no players, to change the state of the system to advance the game to re-start with a new shooter after the state of the system has been changed to terminate the shooter, to change the state of the system to advance the game to finish;

at least one player's terminal for use by a game player, wherein each player's terminal is located within a player's space spaced from the dealer's game table, and has means for inputting bet information of the player, and means for determining which operations the dealer's terminal, the administrative terminal and the player's terminal are permitted to perform depending on status numbers assigned to each state of the system during the progress of the game, in accordance with the following rules:

(a) when the shooter starts, only the dealer's terminal can be operated, (b) when a bet can be made, the player's terminal, the dealer's terminal and the administrative terminal can be operated, (c) when the bet ends, only the dealer's terminal can be operated, (d) when the game is determined, only the dealer's terminal and the administrative terminal can be operated, (e) when the shooter ends, only the administrative terminal can be operated, and (f) when any game system trouble occurs, only the administrative terminal can be operated and the administrative terminal can be operated to change the state of the system to advance the game after the game administrator confirms that the game system trouble has been overcome;

wherein the image server, the database server, the dealer's terminal, the administrative terminal and the player's terminal are connected to each other through a network, the bet information of the player being transmitted from the player's terminal through the network, the game result information being transmitted from the dealer's terminal through the network, and the commands being transmitted from the dealer's terminal and the administrative terminal through the network;

wherein the database server has a bet information recording means for recording the bet information transmitted through the network from the player's terminal, a game result recording means for recording the game result information transmitted through the network from the dealer's terminal, and allotment calculation means for calculating allotment information from the bet information and the game result information and a baccarat appearance table drawing means for drawing baccarat appearance table information from the result of a game and the appearance of a card, and wherein the player's terminal has card image display means for displaying the delivered images and the shooter image delivered through the network from the image server, means for displaying the game result information, the allotment information and the baccarat appearance table information transmitted through the network from the database server and means for switching the display of the shooter image and the display of the baccarat appearance table information.

2. The baccarat game system as claimed in claim 1, wherein the card image display means is located in the player's terminal.

3. The baccarat game system as claimed in claim 1, further comprising: personal information recording means for recording the bet information and the allotment information.

4. The baccarat game system as claimed in claim 1, wherein the player's space includes at least one player's table for holding the player's terminal and which is only used by a player.

5. The baccarat game system as claimed in claim 1, wherein the player's space is a guest room in a hotel.

6. A method of using the baccarat game system as claimed in claim 1, comprising the steps of:

(a) capturing images of cards in a baccarat game actually performed on the dealer's game table, using the car image capture means;

(b) capturing images of the state of the shooter, using the shooter image capture means;

(c) delivering the card images in the baccarat game in real time, using the card image delivery means;

(d) delivering images of the state of the shooter in real time, using the shooter image delivery means;

(e) receiving betting information of the player, at the database server;

(f) receiving game result information about the result of a game and the appearance of a card, at the database server;

(g) recording the bet information of the player, using the bet information recording means;

(h) recording the game result information from the dealer's terminal, using the game result recording means;

(i) calculating allotment information from the bet information and the game result information, using the allotment calculation means;

(j) drawing baccarat appearance table information from the result of a game and the appearance of a card, using the baccarat appearance table drawing means; and (k) displaying the delivered images and the shooter images, on the card image display means:

(l) displaying the game result information, the allotment information and the baccarat appearance table information from the database server, using the means for displaying the game result information, the allotment information and the baccarat appearance table information; and (m) determining the operations the dealer's terminal, the administrative terminal and the player's terminal are permitted to perform depending on the status numbers assigned to each state of the system taking place during the progress of the game, in accordance with the following rules:

(a) when the shooter starts, only the dealer's terminal can be operated, (b) when a bet can be made, the player's terminal, the dealer's terminal and the administrative terminal can be operated, (c) when the bet ends, only the dealer's terminal can be operated, (d) when the game is determined, only the dealer's terminal and the administrative terminal can be operated, (e) when the shooter ends, only the administrative terminal can be operated, and (f) when any game system trouble occurs, only the administrative terminal can be operated and the administrative terminal said the administrative terminal can be operated to change the state of the system to advance the game after the game administrator confirms that the game system trouble has been overcome.

7. The baccarat game system as claimed in claim 1, further comprising a large-sized screen for displaying the card images delivered from the image server.

8. The baccarat game system as claimed in claim 1, further comprising a large-sized screen for displaying the baccarat appearance table information transmitted from the database server.

9. The baccarat game system as claimed in claim 1, wherein the database server has a personal information recording means for recording the bet information and the allotment information.

10. A baccarat game system employing cards, the baccarat game system comprising:

a dealer's game table;

a shooter;

card image capture means for capturing images of cards in a baccarat game actually performed on the dealer's game table;

shooter image capture means for capturing the image of the state of a shooter containing unused cards;

an image server having a card image delivery means for delivering the card images captured by the card image capture means in real time and a shooter image delivery means for delivering a shooter image captured by the shooter image capture means in real time;

a database server;

a dealer's terminal for use by a dealer, wherein the dealer's terminal has means for inputting game result information about the result of a game and the appearance of a card, and means for sending commands to change the state of the system to advance the game to allow betting by players when cards are set in the shooter, to change the state of the system to notify players of imminent termination of the game, to change the state of the system to advance the game to allow betting by players if there have been no players, to change the state of the system to notify players that no further bets can be placed, to change the state of the system to display on the player's terminal whether the player has won or lost and the allotment for the respective players, and to change the state of the system to terminate the shooter if the dealer observes that the shooter does not have the necessary cards for the game;

an administrative terminal for use by a game administrator, wherein the administrative terminal has means for sending commands to change the state of the system to advance the game to an interruption mode if any system trouble occurs, to change the state of the system to advance the game to an appearance table correction mode or a result input correction mode if the administrator finds any mistake in past data, to change the state of the system to advance the game to allow betting by players if there have been no players, to change the state of the system to advance the game to re-start with a new shooter after the state of the system has been changed to terminate the shooter, to change the state of the system to advance the game to finish; and at least one player's terminal for use by a game player, wherein each player's terminal is spaced from the dealer's game table and has means for inputting bet information of the player.

11. The baccarat game system as claimed in claim 10, further comprising means for determining which operations the dealer's terminal, the administrative terminal and the player's terminal are permitted to perform depending on the status numbers assigned to each state of the system taking place during the progress of the game.

12. The baccarat game system as claimed in claim 10, wherein the database server has means for recording the bet information input using the player's terminal, recording the game result information input using the dealer's terminal, calculating allotment information from the bet information and the game result information, and for drawing baccarat appearance table information from the result of a game and the appearance of a card input using the dealer's terminal; and wherein the player's terminal has display means for displaying the delivered images and the shooter image delivered using the image server, displaying the game result information, the allotment information and the baccarat appearance table information recorded by the database server, and switching means for switching the display of the shooter image and the display of the baccarat appearance table information.

13. A method of using the baccarat game system as claimed in claim 12, comprising the steps of:

(a) capturing images of cards in a baccarat game actually performed on the dealer's game table, using the card image capture means;

(b) capturing images of the state of the shooter, using the shooter image capture means;

(c) delivering the card images in the baccarat game in real time, using the card image delivery means;

(d) delivering images of the state of the shooter in real time, using the shooter image delivery means;

(e) receiving betting information of the player, at the database server;

(f) receiving game result information about the result of a game and the appearance of a card, at the database server;

(g) recording the bet information of the player, using the database server;

(h) recording the game result information from the dealer's terminal, using the database server;

(i) calculating allotment information from the bet information and the game result information, using the database server;

(j) drawing baccarat appearance table information from the result of a game and the appearance of a card, using the database server; and (k) displaying the delivered images and the shooter images, on the card image display means;

(l) displaying the game result information, the allotment information and the baccarat appearance table information from the database server, using the display means of the player's terminal;

(m) determining each operation to be performed by the dealer's terminal, the administrative terminal and the player's terminal depending on the status numbers assigned to each transition in the state of the system taking place during the progress of the game, wherein the status number changes depending on the actions taken by the dealer using the dealer's terminal and actions taken by the administrator using the administrative terminal.

* * * * *